(12) United States Patent
Hurenkamp et al.

(10) Patent No.: US 9,309,408 B2
(45) Date of Patent: Apr. 12, 2016

(54) ADDITIVE CONCENTRATE AND USE THEREOF

(75) Inventors: Johannes Henricus Hurenkamp, Apeldoorn (NL); Caspar Jules Albert Anton Roelofs, Apeldoorn (NL); Jeroen Marissen, Apeldoorn (NL)

(73) Assignee: HOLLAND COLOURS N.V., Apeldoorn (NL)

( * ) Notice: Subject to any disclaimer, the term of this patent is extended or adjusted under 35 U.S.C. 154(b) by 233 days.

(21) Appl. No.: 14/239,123

(22) PCT Filed: Aug. 14, 2012

(86) PCT No.: PCT/NL2012/050564
§ 371 (c)(1),
(2), (4) Date: Mar. 31, 2014

(87) PCT Pub. No.: WO2013/025098
PCT Pub. Date: Feb. 21, 2013

(65) Prior Publication Data
US 2014/0353550 A1 Dec. 4, 2014

(30) Foreign Application Priority Data
Aug. 15, 2011 (EP) .................. 11177565

(51) Int. Cl.
| | |
|---|---|
| C08L 91/06 | (2006.01) |
| C08J 3/22 | (2006.01) |
| C08L 23/10 | (2006.01) |
| C08K 5/1575 | (2006.01) |
| C08K 5/20 | (2006.01) |
| C08K 5/52 | (2006.01) |

(52) U.S. Cl.
CPC ............. *C08L 91/06* (2013.01); *C08J 3/226* (2013.01); *C08K 5/1575* (2013.01); *C08K 5/20* (2013.01); *C08K 5/52* (2013.01); *C08L 23/10* (2013.01); *C08J 2323/10* (2013.01); *C08J 2423/02* (2013.01)

(58) Field of Classification Search
CPC .... C08J 3/226; C08J 2323/10; C08J 2423/02; C08L 23/10; C08L 91/06; C08K 5/0083; C08K 5/1575; C08K 5/20; C08K 5/52
See application file for complete search history.

(56) References Cited

U.S. PATENT DOCUMENTS

| | | | |
|---|---|---|---|
| 2005/0101713 A1* | 5/2005 | Lake, Jr. ................... | C08J 3/22 524/285 |
| 2006/0128860 A1 | 6/2006 | Chundury et al. | |
| 2006/0247332 A1* | 11/2006 | Coffey ...................... | C08J 3/18 523/351 |
| 2010/0224825 A1 | 9/2010 | Kochanowicz et al. | |
| 2011/0159346 A1 | 6/2011 | Yamamoto et al. | |

FOREIGN PATENT DOCUMENTS

| | | |
|---|---|---|
| CN | 101942146 | 1/2011 |
| KR | 10-2010-0077500 | 7/2010 |

OTHER PUBLICATIONS

International Search Report for PCT/NL2012/050564, mailed Sep. 24, 2012, 3 pages.

* cited by examiner

*Primary Examiner* — Joseph D Anthony
(74) *Attorney, Agent, or Firm* — Morrison & Foerster LLP

(57) ABSTRACT

The invention is directed to an additive composition comprising at least one clarifying and/or nucleating agent for polyolefins, which agent is a powder having a melting point of at least 190° C., in an amount of at least 70 wt. %, based on the weight of the composition, and at least one wax having a viscosity, as defined herein of at least 500 m Pa·s, in an amount between 0.5 and 30 wt. %, based on the weight of the composition.

15 Claims, No Drawings

ADDITIVE CONCENTRATE AND USE THEREOF

CROSS-REFERENCE TO RELATED APPLICATIONS

This application is the national phase of PCT application PCT/NL2012/050564 having an international filing date of 14 Aug. 2012, which claims benefit of European patent application No. 11177565.6 filed 15 Aug. 2011. The contents of the above patent applications are incorporated by reference herein in their entirety.

The present invention is in the area of additive compositions for polyolefins, more in particular of concentrates of nucleating and/or clarifying agents for polyolefins, especially for polypropylene.

Polyolefins, more particularly propylene polymers and especially polypropylenes, require the use of so-called nucleating agents or clarifying agents. These clarifying agents are needed to impart transparency by preventing or reducing haze in the polyolefin products. The effect thereof can be that polypropylene approaches the look of the so-called high clarity plastics, such as polystyrene, polyethylene terephthalate and polycarbonate.

These agents are added to the polyolefin at a suitable stage of the production or processing of the polyolefin or the use thereof. For example, often the clarifying agent, or a concentrate thereof, is added to the polyolefin during the compounding step.

Suitable clarifying agents are based on alditols, such as xylitol and sorbitol, in the form of a reaction product with an optionally substituted benzaldehyde. Suitable clarifying agents have been described in U.S. Pat. No. 7,662,978 and in international patent application WO 2010/101610, the contents of which documents is incorporated herein by way of reference.

As indicated, the clarifying agents are added to the polyolefin (melt) at some time during the production or processing. A disadvantage of some of the clarifying agents is that they are in powdery form and are rather difficult to be processed as such, in view of dusting or blocking, which causes fluctuations in dosing level in the polymer resin during extrusion, with the linked fluctuation of properties in the final product (see for example WO 2007/032797).

To solve this dosing problem one has to use common methods known in the industry, which are used to add additives which are difficult to dose: e.g., dilution with virgin polymer powder until it becomes a free flowing mixture or combining with other additives and compressing to pellets, a so-called one-pack. These methods create additional, costly steps which have to be taken by the user.

Alternatively, in the above mentioned international patent application WO 2010/101610, it has been described to make a relatively dilute composition of some clarifying agents using a liquid hydrocarbon and a specific surfactant. This has the great disadvantage that a large amount of additional material is added to the polyolefin, influencing the composition and possibly resulting in a deterioration of the product properties.

Furthermore, it is known that the use of xylitol and sorbitol based clarifiers may lead to the appearance of gels and/or specks in the final product during the injection moulding process. EP-A 948 564 mentions U.S. Pat. No. 5,135,975 in the background art section of the description, which U.S. Patent is concerned: "with clarifying agents commercially known as the Millad™ group of products produced by Milliken Chemicals. These additives, particularly Millad™ 3988 have good organoleptic properties and resist plate-out, but dispersion problems resulting in the appearance of white specks have been encountered by some users. Relatively high process temperatures are needed to prevent the appearance of these white specks."

The only way to prevent the formation of these specks is to increase the processing temperature during the compounding and injection moulding steps. This is not desirable from an energy saving point of view and the higher temperature can cause increased degradation and yellowing also.

Surprisingly, using the clarifying concentrate described in the present patent application, solves this speck problem in many of those cases, while still allowing for the use of low temperatures during compounding and injection moulding.

Accordingly, it is an object of the invention to provide for an improved clarifying additive composition for use in polyolefins.

The present invention is directed to an additive composition comprising at least one clarifying and/or nucleating agent for polyolefins, which agent is a powder having a melting point of at least 190° C., in an amount of at least 70 wt. %, based on the weight of the composition, and at least one wax having a viscosity, as defined herein of at least 500 mPa·s, in an amount between 0.5 and 30 wt. %, based on the weight of the composition of the concentrate.

The composition preferably consists of 75 to 99.5 wt. % of said agent, 0.5 to 25 wt. % of said wax and 0 to 15 wt. % of at least one other additive (not being a powdery clarifying and/or nucleating agent for polyolefins).

Preferably the viscosity of the wax is at least 650 mPa·s, more in particular at least 20,000 mPa·s and can be up to 75,000 mPa·s or more. A preferred range is between 20,000 and 75,000 mPa·s. All viscosities are determined by DIN 53018 at 140° C. for waxes with a softening point below 140° C., at 170° C. for waxes with a softening point from 140° C. to 170° C., at 190° C. for waxes with a softening point from 170° C. to 190° C. and at 240° C. for waxes with a softening point from 190° C. to 240° C.

The wax is preferably a synthetic wax, more specifically an olefin wax, more in particular a polyethylene wax. Because of the combination of the specific properties of the clarifying agent and of the wax (melting point and viscosity) it has been found to be possible to produce an additive composition or concentrate having a very high load.

The composition of the present invention is an easy dosable particle based concentrate, that has the important advantage that it is possible to add the required amounts of additive to the polyolefin without unduly adding unwanted other components in large amounts to the polyolefin. As a consequence, the properties of the final polyolefin composition are not negatively influenced, or are even improved.

The main components of the concentrate composition are the additive and the waxy matrix material. The composition is in particle form.

The waxy material may be selected from natural, synthetic and modified natural waxes. A practicable definition for waxes was developed by the M-Wax Department of the German Society for Fat Science (Deutsche Gesellschaft für Fettwissenschaft or DGF for short), first published in 1957 and revised in 1974: "Wax is a technical collective designation for a series of natural or artificially produced materials that have the following characteristics:
>kneadable at 20° C., firm to brittle hard;
>coarsely to finely crystalline, translucent to opaque, but not glassy;
>melts above 40° C., without breaking down;
>relatively low viscosity already just above the melting point;

>consistency and solubility heavily dependent on temperature;
>polishable under light pressure."

In general, waxes are classified as follows:
a. Natural waxes:
>Animal, vegetable, and mineral in origin.
b. Artificial waxes:
b1.>Chemically modified waxes/semisynthetic waxes, where an existing wax molecule is chemically modified, more specifically modified oils, such as hydrogenated oils.
b2.>Synthetic waxes: A wax is built up on a low-molecular, non-waxy molecule or by decomposition of a macro-molecular plastic.

According to a preferred embodiment the waxy material has been selected from the group of artificial waxes.

Especially when using a wax based on polyolefins, more in particular a polyethylene wax, the additive composition makes it possible to produce polyolefin products having no or very little haze, with improved product properties and improved speck performance.

Preferably, the polyolefin wax has such properties that it is possible to produce the additive composition at a temperature above the softening point of the wax. Generally this means that the viscosity is within the specified ranges. It is preferred to use a polyethylene wax having a softening point according to ASTM D 3104 of between 120 and 350° C., preferably between 125 and 175° C.

Suitable waxes are commercially available, for example from companies like Clariant, Evonik and Honeywell.

Suitable clarifying agents have a melting point that is higher than the processing temperature of the polyolefin (polypropylene) in which it is used. The clarifying agents are powdery, which means that they are solid at 25° C. and that their particle size is quite low, for example between 0.1 micron and 1 mm.

Examples of clarifying agents to be used in the composition of the present invention are sorbitol derivatives, such as Dibenzylidene sorbitol, Bis(p-methylbenzylidene)sorbitol, Bis(4-p ropylbenzylidene) propyl sorbitol, and other clarifiers like 2,2'-Methylenebis(4,6-di-tert-butylphenol) phosphate sodium salt, 1,3,5-benzenetriscarboxamide derivatives or N,N',N''-Tris(2-methylcyclohexyl)-1,2,3-propanetricarboxamide.

Suitable other additives to be combined with the clarifying agents are e.g., anti-oxidants, acid-scavengers, anti-static agents, colourants, neutralizers and anti-slip agents.

It is to noted that the above additives are usually intended to be incorporated into the polyolefin, for various reasons, such as modification or improvement of the properties thereof, as processing aid, or to reduce formation of by-products, and the like.

However, it is also possible to include certain additives in the composition that have a function in the production of the additive composition itself, for example to stabilize the composition.

The invention is further directed to a process for the preparation of a concentrate composition suitable for melt blending of nucleating and/or clarifying additives into polymers or polymer blends, comprising the dispersion of the additive into the said waxy material at a temperature at which the wax is liquid, shaping and cooling the dispersion thus obtained to form solid particles.

In a further embodiment the invention is directed to the use of an amount of between 0.1 and 5 wt. % of the additive composition according to the invention in polypropylene.

EXAMPLE

Several waxes were combined with an alditol based clarifier in a concentrate and tested in polypropylene polymer at 4000 ppm dosing level of the clarifier, with varying performance, as can be seen in the table.

| Wax | Visual observation of dispersion performance in PP |
|---|---|
| None (pure powder) | + |
| Honeywell A-C 715 | − |
| Honeywell A-C 735 | + |
| Honeywell A-C 1754 | + |
| Clariant Licowax PE130 | − |
| Clariant Licowax PE520 | ++ |
| Clariant Licocene PP1602 | + |
| Clariant Licocene PP2602 | + |
| Wiwax Wiraten 110 | − |

Note:
++ = very good, + = good, − = poor and −− = very poor

The invention claimed is:

1. An additive composition comprising at least one powdery clarifying and/or nucleating agent for polyolefins, which agent is a powder having a melting point of at least 190° C., in an amount of at least 70 wt. %, based on the weight of the composition, and at least one wax having a viscosity of at least 500 mPa·s, in an amount between 0.5 and 30 wt. %, based on the weight of the composition,
wherein the viscosity of the wax is determined by DIN 53018 at 140° C. for waxes with a softening point below 140° C., at 170° C. for waxes with a softening point from 140° C. to 170° C., at 190° C. for waxes with a softening point from 170° C. to 190° C. and at 240° C. for waxes with a softening point from 190° C. to 240° C.

2. The additive composition of claim 1, wherein the composition consists of 75 to 99.5 wt. % of said agent, 0.5 to 25 wt. % of said wax and 0 to 15 wt. % of at least one other additive.

3. The additive composition of claim 1, wherein the said clarifying and/or nucleating agent is an alditol based compound.

4. The additive composition of claim 3, wherein the said alditol based compound is a xylitol or sorbitol derived product.

5. The additive composition of claim 4, wherein the said alditol based compound is the reaction product of sorbitol and a benzaldehyde.

6. The additive composition of claim 4, wherein the said alditol based compound is selected from the group consisting of Bis(4-propylbenzylidene) propyl sorbitol, Dibenzylidene sorbitol and Bis(p-methylbenzylidene)sorbitol.

7. The additive composition of claim 1, wherein the said powdery clarifying and/or nucleating agent for polyolefins is selected from the group consisting of 2,2' Methylenebis(4,6-di-tert-butylphenol) phosphate sodium salt, 1,3,5-benzenetriscarboxamide derivatives and N,N',N''-Tris(2 methylcyclohexyl)-1,2,3-propanetricarboxamide.

8. The additive composition of claim 1, wherein the wax is a polyolefin wax.

9. The additive composition of claim 1, further comprising at least one of the group consisting of anti-oxidants, acid-scavengers, anti-static agents, colourants, neutralizers and anti-slip agents.

10. The additive composition of claim 1 wherein the viscosity of the wax is at least 650 mPa·s.

11. The additive composition of claim 10, wherein the viscosity of the wax is between 20,000 and 75,000 mPa·s.

12. A process for the preparation of the additive composition of claim 1, suitable for melt blending of a nucleating and/or clarifying agent into polymers or polymer blends, which process comprises dispersing said agent into the said wax at a temperature at which the wax is liquid, shaping and cooling the dispersion thus obtained to form solid particles.

13. The additive composition of claim 10, wherein the viscosity of the wax is at least 20,000 mPa·s.

14. The additive composition of claim 8, wherein the wax is a polyethylene wax.

15. The additive composition of claim 14, wherein the wax is a polyethylene wax having a softening point according to ASTM D 3104 of between 120 and 350° C.

* * * * *